(12) United States Patent
Page (10) Patent No.: US 7,019,898 B2
(45) Date of Patent: Mar. 28, 2006

(54) FLEXIBLE RECONFIGURABLE SURFACE

(76) Inventor: Derrick John Page, 1645 Severn Chapel Rd., Crownsville, MD (US) 21032

( * ) Notice: Subject to any disclaimer, the term of this patent is extended or adjusted under 35 U.S.C. 154(b) by 240 days.

(21) Appl. No.: 10/245,634

(22) Filed: Sep. 18, 2002

(65) Prior Publication Data

US 2003/0130818 A1   Jul. 10, 2003

Related U.S. Application Data

(63) Continuation-in-part of application No. 10/041,986, filed on Jan. 9, 2002, now Pat. No. 6,903,871.

(51) Int. Cl.
    G03B 21/56 (2006.01)
    G03F 6/00 (2006.01)
    A47G 1/06 (2006.01)
    B29C 47/96 (2006.01)
    B28B 11/08 (2006.01)

(52) U.S. Cl. .................. 359/451; 359/893; 425/150; 425/388

(58) Field of Classification Search ............... 359/443, 359/277, 446, 451, 893; 40/800; 425/162, 425/150, 388
See application file for complete search history.

(56) References Cited

U.S. PATENT DOCUMENTS

| | | | | |
|---|---|---|---|---|
| 2,100,148 A | * | 11/1937 | Parker | 40/582 |
| 3,140,347 A | * | 7/1964 | Cohen | 84/464 R |
| 4,005,932 A | * | 2/1977 | Gates | 353/6 |
| 4,252,514 A | * | 2/1981 | Gates | 425/162 |
| 4,412,799 A | * | 11/1983 | Gates | 425/150 |
| 5,793,918 A | * | 8/1998 | Hogan | 385/116 |

* cited by examiner

*Primary Examiner*—W. B. Perkey
*Assistant Examiner*—Magda Cruz
(74) *Attorney, Agent, or Firm*—H. C. Lin (57) ABSTRACT

A three-dimensional surface shape is produced from input numerical data. The shape of an elastic surface is determined by the positions of a first matrix of memory rods. The position of each of the memory rods is determined by a flexible sheet which is contoured by a second matrix of control rods and is computer-controlled. After control rods transfer the contour data to the memory rods, the control rods are reset to receive new contour data. Both the memory rod and control rod are fitted with two pneumatically controlled locking mechanisms, one for the X-coordinate and one for the Y-coordinate. When both locks on a particular rod are released the rod is free to move to a new position determined by an elevator. Once all of the rods have been adjusted, they are locked in position and the surface has been configured.

27 Claims, 7 Drawing Sheets

FLEXIBLE RECONFIGURABLE SURFACE

This application is a continuation-in-part of application Ser. No. 10/041,986, filed on Jan. 9, 2002, now pending.

BACKGROUND OF THE INVENTION (1) Field of the Invention

This invention relates to the forming of a three-dimensional surface using data from a computer.

(2) Description of the Prior Art

Three-dimensional surfaces may be produced in a number of ways. For instance, a computer controlled milling machine can be employed to machine a surface that has been described by numerical input data The surface can be milled on a variety of materials such as metals, plastics or wood. Alternatively, stereo-lithographic machines have been developed that use lasers to cross-link polymer material. The position of the laser beam relative to the polymer liquid is controlled by a computer system using input data that describes the required surface.

In copending patent application Ser. No. 10/041,986, a reconfigurable surface was disclosed. However, the surface cannot be updated repeatedly to display different surface contours at a rapid rate or to achieve special effects such as morphing one image onto the next. It is desirable to configure into different surfaces in succession

SUMMARY OF THE INVENTION

I describe in this invention a means of producing a three-dimensional surface from numerical data. Unlike the previous approaches, once the surface has been produced it can be reconfigured repeatedly into other surfaces as required. This invention can be applied to a large number of applications, including the production of topographical maps, as molds for casting surfaces, and for three-dimensional variable images.

I provide a device that can produce a three-dimensional surface shape from input numerical data. The shape of a sheet elastic material is determined by the positions of a matrix of control rods. The position of each of the rods is determined by a computer-controlled system. Each rod is fitted with two locking mechanisms, one for the X coordinate and one for the Y coordinate. When both locks on a particular rod are released the rod is free to move to a new position determined by an elevator. Once all of the rods have been adjusted they are locked in positions that represents the surface shape to be configured. The positions of the rods may then be transferred to a second set of rods that are fitted with locks that can memorize the positions of the first set of rods. The first set of rods can then be reconfigured to a new pattern. In one application, the surface can be used as a mold for casting a replica or in another application can be used as the screen in an image projection system.

DETAILED DESCRIPTION OF THE PREFERRED EMBODIMENT

Figure 1:
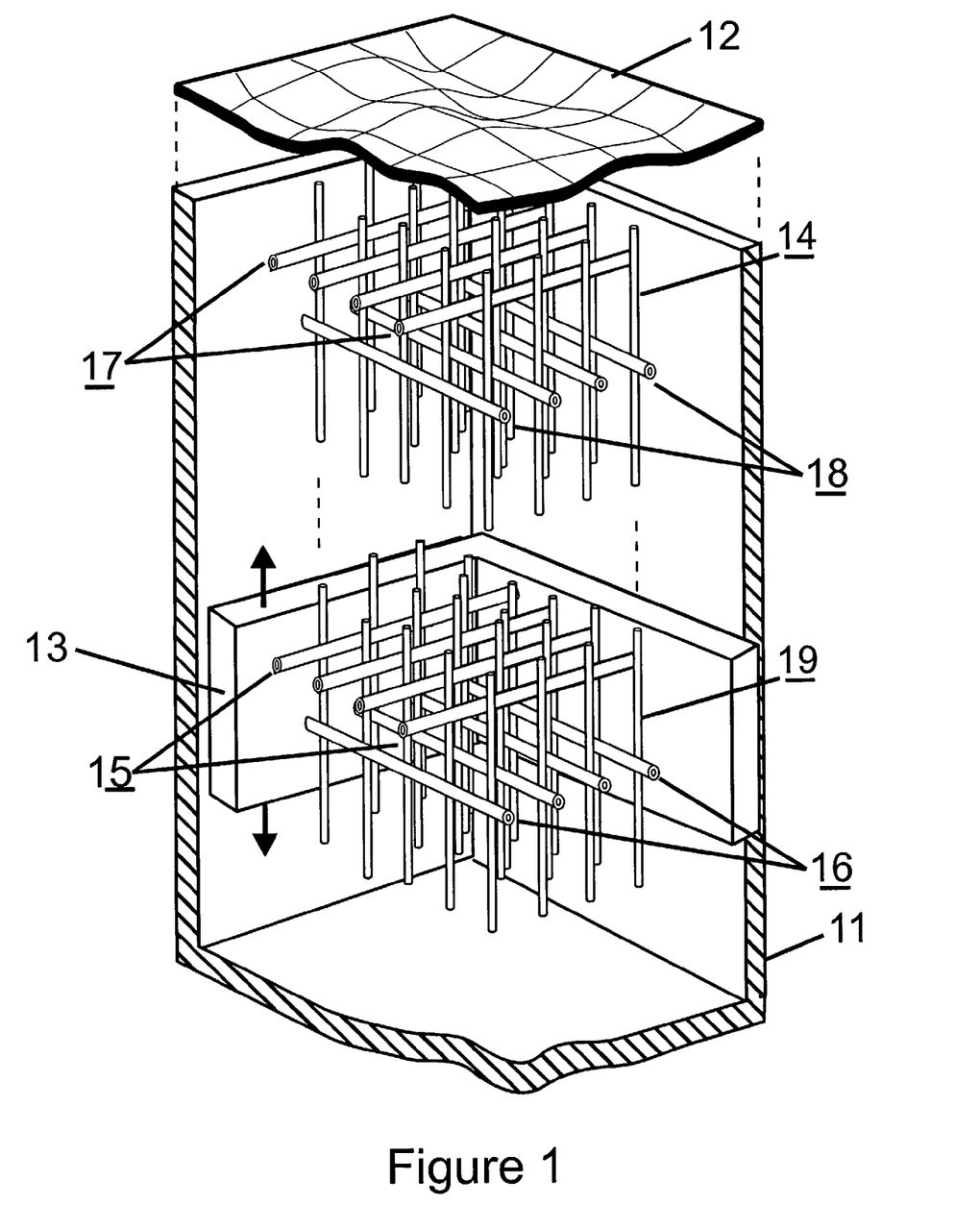
FIG. 1 shows the basic components of the reconfigurable system.

FIG. 1 shows elements of the preferred invention. The mechanism is designed to produce a three-dimensional surface shape from a set of numerical data. The surface can be repeatedly reshaped to other sets of data as required. A flexible elastic sheet 12 is shown resting on an array of memory rods 14 and mounted by the edges to an enclosure 11. Enclosure 11 is airtight and is fitted with an exhaust pump (not shown). The reduced pressure inside the enclosure causes the sheet 12 to be sucked down onto the ends of the set of memory rods 14 thereby creating the desired 3-dimensional shape in the elastic sheet 12. The memory rods 14 can be locked in place by orthogonal sets of pneumatic tubes 17 and 18. A set of control rods 19 can be locked in place by orthogonal sets of pneumatic tubes 15 and 16. An elevator 13 is mounted within the enclosure and is able to move up and down on command by means of a computer controlled hydraulic or electrical drive system (not shown). The elevator moves the pneumatic clamping tubes 15 and 16 up and down. A pattern can be written in the control rods 19 by selectively clamping them and moving the elevator. This pattern can be transferred from the control rods 19 to the memory rods 14 by raising the elevator and releasing the locks on the memory rods. The memory locks are re-locked. Each memory rod 14 falls onto its corresponding control rod 19. The elevator can then be lowered and another pattern written into the control rods 19. This second pattern can then be transferred to the memory rods to refresh the pattern in the flexible sheet.

Figure 2:
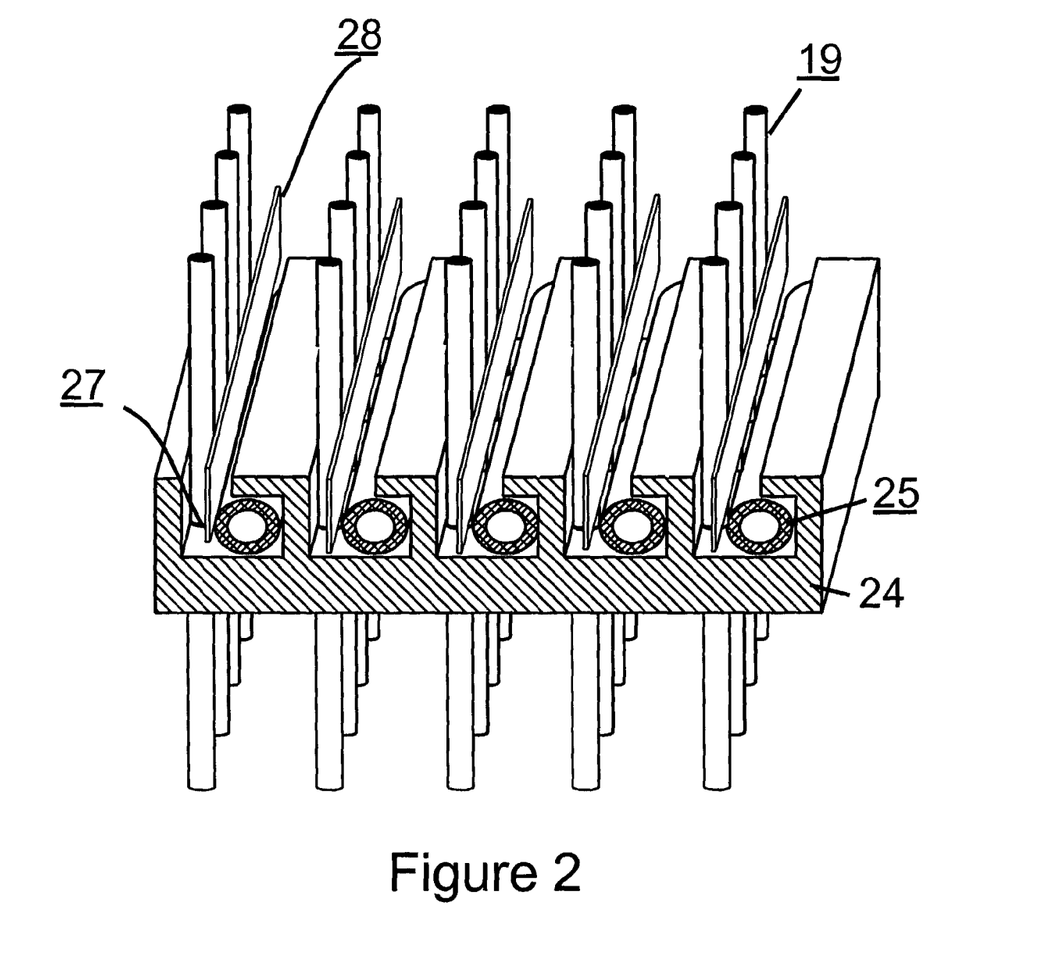
FIG. 2 shows the pneumatic locking mechanism used to control the positions of the control rods.

FIG. 2 shows the preferred locking mechanism for locking the control rods. The control rods, 19, are held in holes 27 in fixture 24. Pneumatic tube of latex rubber or similar material 25 is housed in fixture 24. A set of freely moving pressure plates 28 is arranged between the pneumatic tubes and the control rods 19. When a pneumatic tube is inflated, it expands and forces the pressure plate against the control rods 19, thereby locking the control rods 19 in place. The memory rods are locked and unlocked with a like mechanism.

Figure 3:
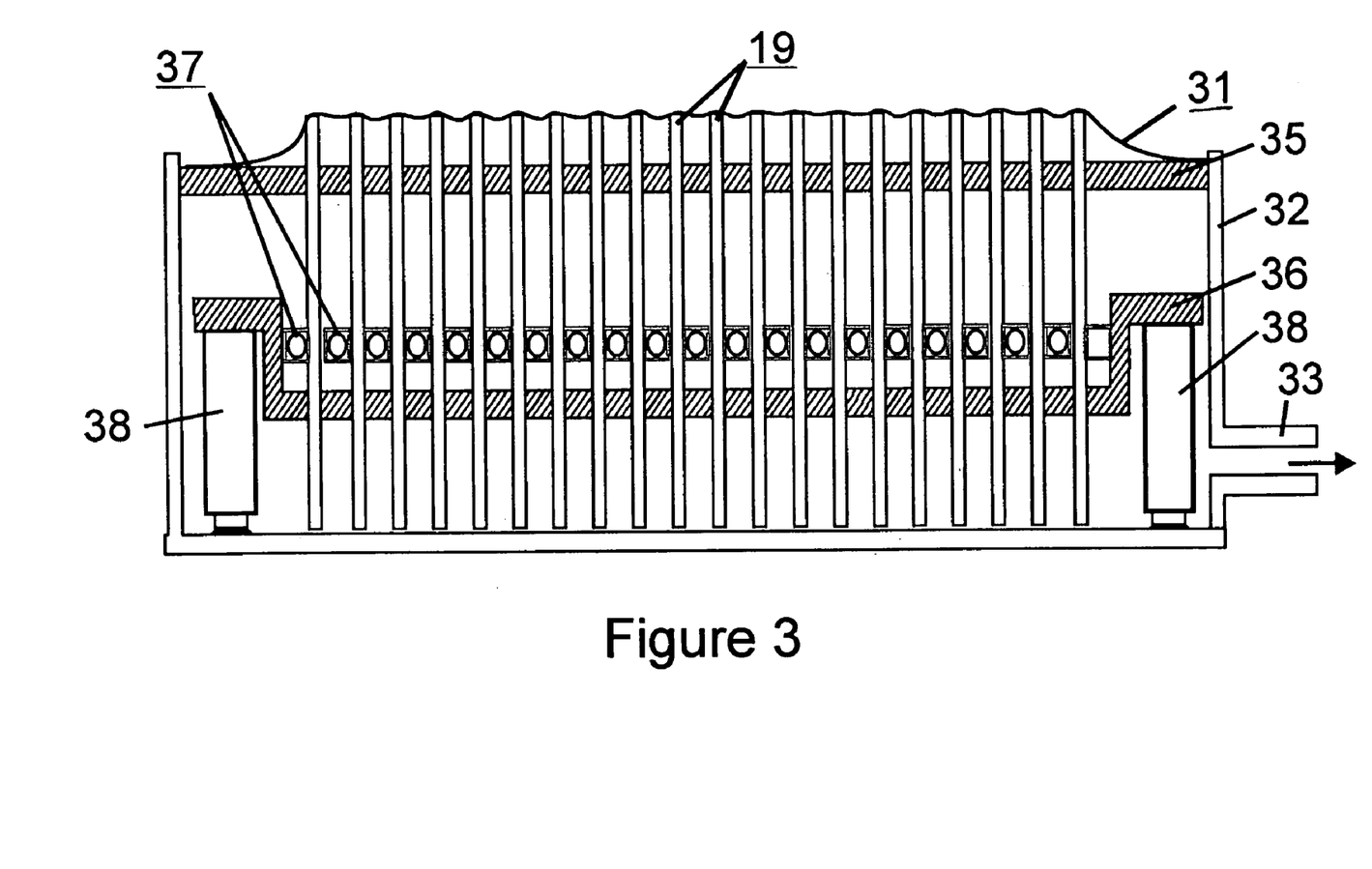
FIG. 3 shows a cross-section of the reconfigurable system for the case where memory rods are not employed.

FIG. 3 shows a first embodiment of the mechanism for forming a pattern in the control rods 19. A latex rubber sheet 31 is attached at the edges to housing, 32 that can be evacuated through port 33. The control rods 19 are held in place by passing through holes in plate 35 and through holes in fixture 36. The fixture 36 contains two sets of orthogonal pneumatic tubes. One set, 37 is shown in cross-section and the other is arranged orthogonally below in the lower part of fixture 36.

The fixture 36 can be raised or lowered by the mechanism 38. The mechanism can be hydraulically or electrically activated.

Figure 4:
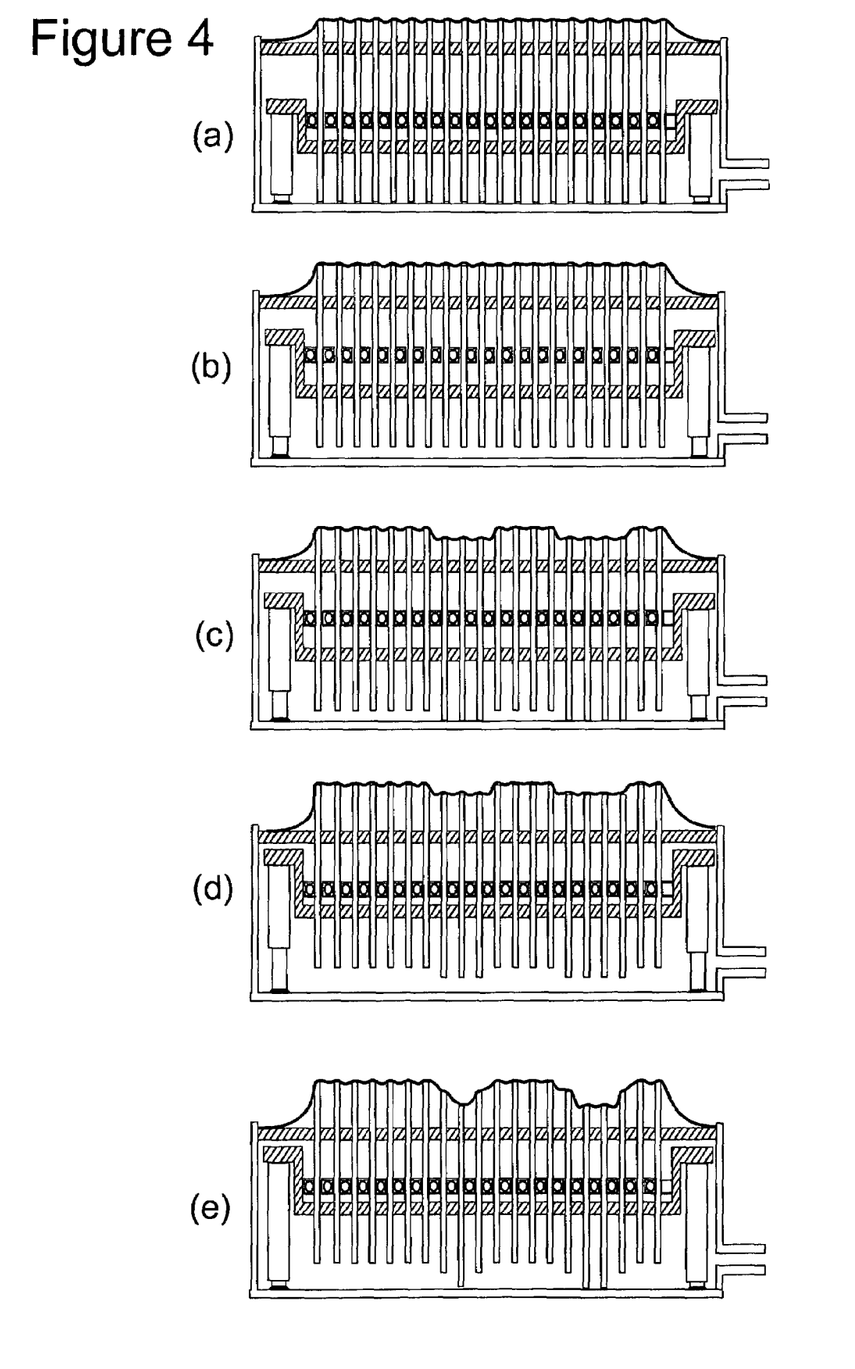
FIG. 4 shows a sequence of operations used to form a configured surface.

FIG. 4 shows the sequence of movements to write two successive write operations for the mechanism shown in FIG. 3. This demonstrates the operation of the invention. The controlled sequence of locking and unlocking of the control rods and the controlled movement of the elevator can form a desired shape in the flexible elastic sheet 12 shown in FIG. 3.

To form a shaped surface all the pneumatic tubes are first deflated, unlocking all the control rods, and the elevator is moved to the lowest start position as shown in FIG. 4a. The pressure is then reduced in the enclosure by extracting some air. Next the pneumatic tubes are inflated to lock the control rods in position. The elevator is then moved to a higher position and the locked rods move up with the elevator and push the latex rubber sheet to a higher elevation. This positioning is shown in FIG. 4b. At this point selected pneumatic tubes are deflated thereby unlocking selected control rods. The unlocked control rods then fall to the floor of the enclosure by a combination of the force of gravity and the force exerted by the rubber sheet. All of the control rods are then re-locked. This stage is shown in FIG. 4c. The elevator is then moved up further to the position shown in FIG. 4d. Selected control rods are then released and allowed to fall to the floor of the enclosure. This is shown in FIG. 4e. This procedure of locking and raising and releasing selected rods can be repeated until the desired pattern is achieved.

A new shape can be "written" into the sheet by releasing the pressure in all of the tubes and releasing all of the rods. The elevator can then be moved down to the starting position. A new programming sequence can then be initiated.

Figure 5:
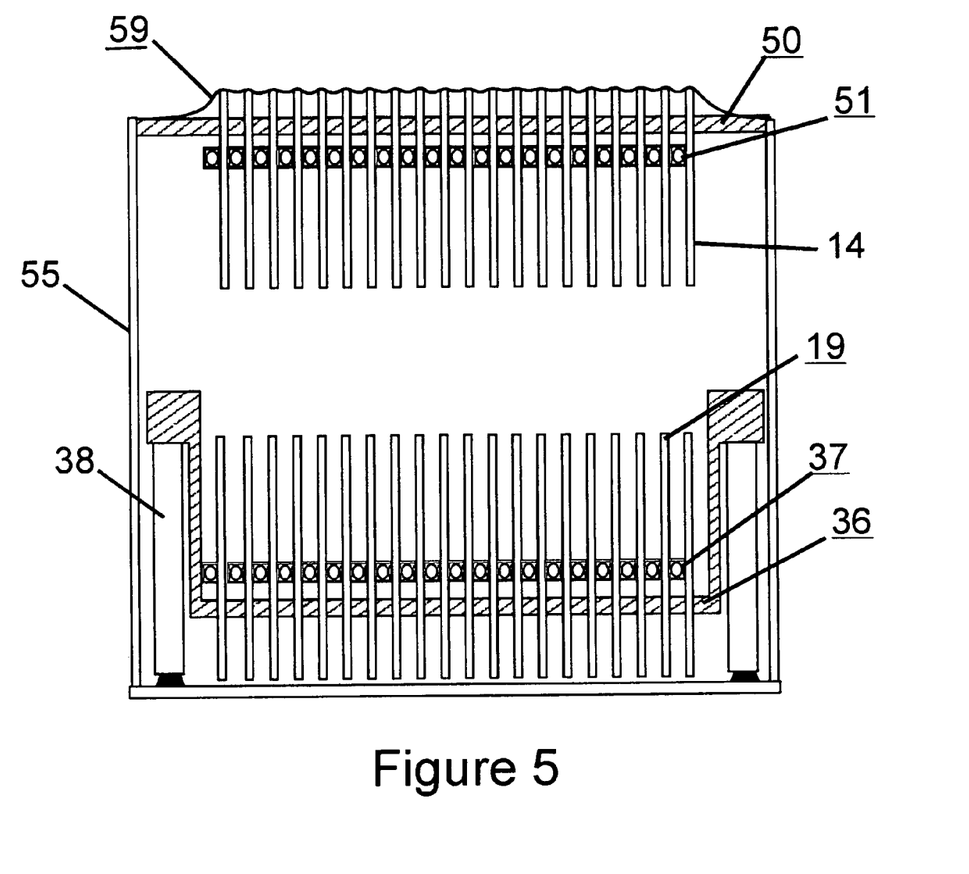
FIG. 5 shows a cross-section of the reconfigurable system for the case where memory rods are employed.

FIG. 5 shows a second embodiment of the invention. In this case, one pattern can be studied while a second pattern is being written. The flexible sheet 59 is attached to evacuated box 55. Control rods 19 are held in locking mechanism 37 and orthogonal locking mechanism 36. The locking mechanism can be raised or lowered by lifting mechanism 38. A set of memory rods 14 is arranged above and in alignment with the control rods 19. These memory rods 14 are held in position by orthogonal locking mechanisms 50 and 51.

Once a pattern has been written in the lower control rods, the pattern can be transferred to the upper memory rods by raising the lifting mechanism and momentarily releasing the memory rods. The memory rods will fall onto the control rods and assume the same shape. The memory rods can then be locked in place and the control rods lowered, ready for another write cycle.

Figure 6:
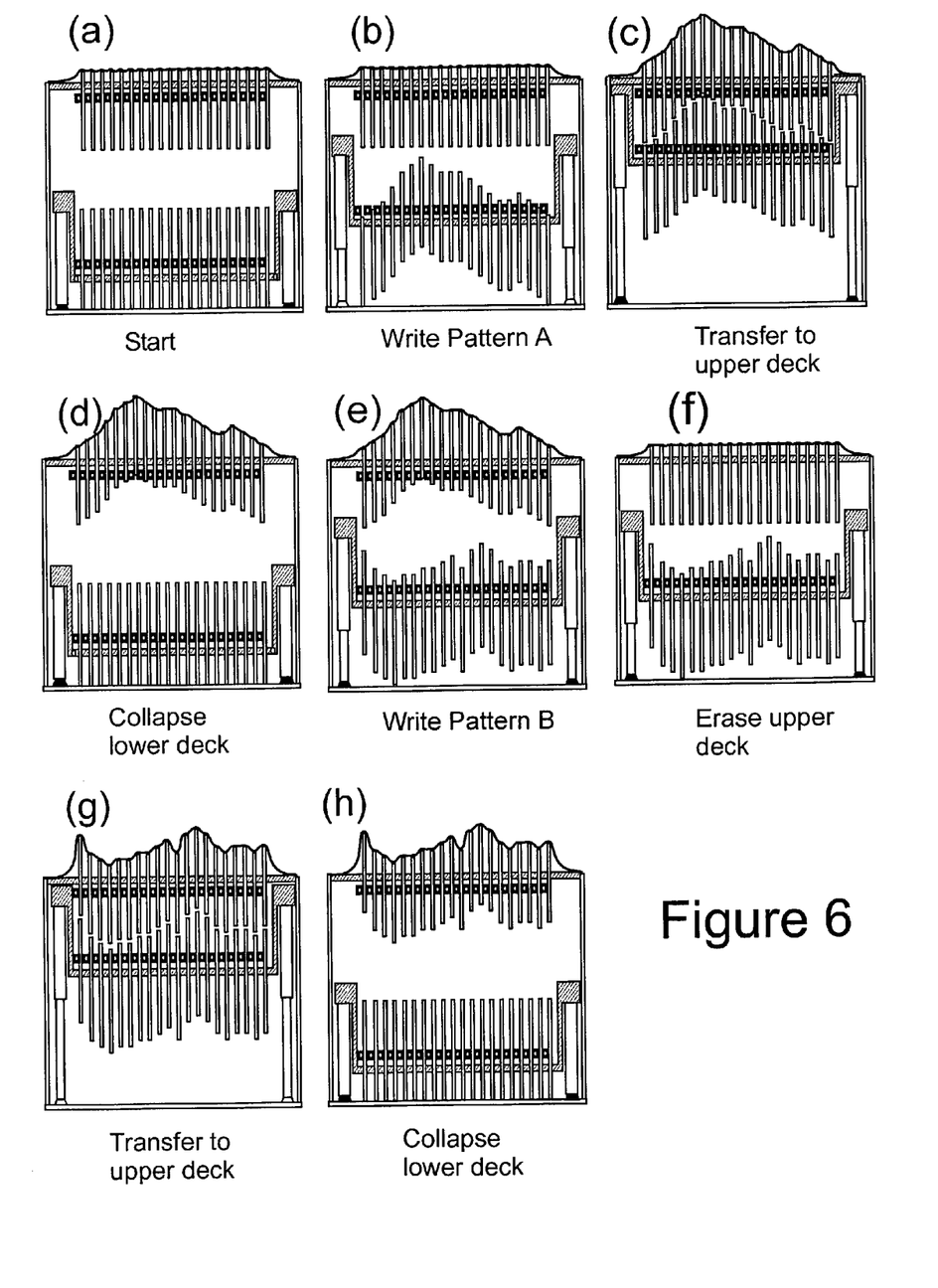
FIG. 6 shows a sequence of operations used to form a configured surface using memory rods.

FIG. 6 shows a sequence of events used to write two successive shapes. FIG. 6a shows the positions of the lower control rods and the upper memory rods when all the rods are unlocked. By selectively locking and unlocking the control rods and incrementally raising the elevator, a pattern may be written into the control rods as was shown in the sequence of FIG. 4. At this stage the rods have the positions shown in FIG. 6b. The control rods are then raised as a group to contact the memory rods. The memory rods are unlocked allowing them to push the flexible rubber sheet up to form the desired shape. The memory rods are then locked once more. This is the situation in FIG. 6c. The control rods are then unlocked and lowered to the bottom position, as shown in FIG. 6d. A new pattern is then written into the control rods as shown in FIG. 6e. The locks on the upper memory rods are then released allowing them to assume their lowest position. The elevator is then raised and the new pattern transferred to the memory rods as illustrated in FIG. 6g. The control rods are then released and lowered to the bottom position as shown in FIG. 6h. At this point another pattern may be written into the control rods and the cycle repeated.

Figure 7:
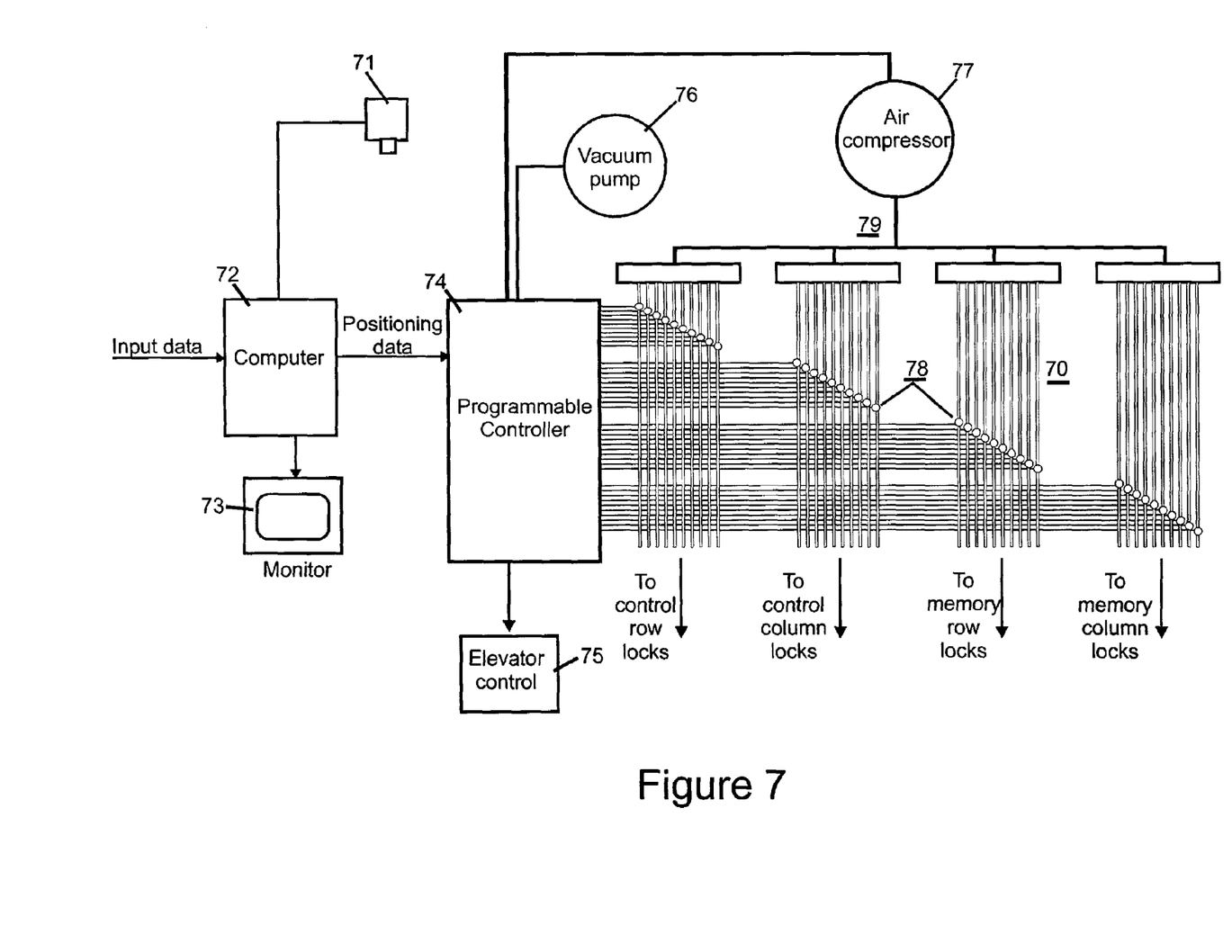
FIG. 7 is a schematic of the control system for the configurable surface.

FIG. 7 shows a schematic of the control system for the second embodiment of the equipment capable of forming the 3-dimensional surface.

The data that describes the surface, the elevation data in the case when a contour map is being written, is loaded into the computer 72. This data may include an orthophoto that can be projected onto the formed surface by projector 71 and viewed on monitor 73. After the data is processed it is passed to the programmable controller 74. The programmable controller sends out the appropriate signals to the air compressor 77, the vacuum pump 76 and the elevator control 75. Signals are also sent to the valves 78 to control the passage of compressed air from the compressor via the manifolds 79 through the pneumatic lines 70. These lines are connected to the rubber tubes that are part of the locks on the two orthogonal sets of locks used to position the control rods and the memory rods.

Although pneumatic locks have been described here to perform the rod locking function, it should be realized that there are many alternatives such are mechanical locks or magnetic locks.

Although the preferred embodiment has the control rods and memory rods arranged vertically, other arrangements are possible. As the rubber sheet forming the contour surface retains the rods, the equipment may be mounted horizontally and hung on a wall for instance. While the flexible surface 12 and the flexible elastic sheet 31 have been described as being tangible, they can also be of air (i.e. virtual).

Another feature of the invention is that in some applications only a portion of the array of rods need be updated, to save rewrite time, or to achieve special effects such as morphing one image onto the next.

While particular embodiments of the invention have been described, it will be apparent to those skilled in the art that various modifications may be made in the embodiment without departing from the spirit of the present invention. Such modifications are all within the scope of this invention.

What is claimed is:

1. A reconfigurable surface, comprising:
   a flexible elastic sheet;
   a first matrix of memory rods placed under said flexible elastic sheet for contouring said flexible elastic sheet to a desired shape;
   a second matrix of control rods placed below said matrix of memory rods for receiving input contour data and movable towards and away from said first matrix of memory rods; and
   a means of controlling the position of each of said control rods using data from a computer.

2. The reconfigurable surface as described in claim 1, wherein said flexible elastic sheet is supported by and in contact with the tips of said memory rods.

3. The reconfigurable surface as described in claim 2, wherein said flexible elastic sheet is sucked against said tips of said memory rods.

4. The reconfigurable surface as described in claim 3, further comprising a chamber for housing said memory rods and control rods, and evacuated for creating a suction to suck said flexible elastic sheet against said tips of said memory rods.

5. The reconfigurable surface as described in claim 4, further comprising an elevator attached to a locking mechanism which can lock and unlock said control rods, and can raise and lower said control rods.

6. The reconfigurable surface as described in claim 5, wherein said elevator is reset at the lowest position when all the locks are released and the control rods drop to their lowest position.

7. The reconfigurable surface as described in claim 5, further comprising:
   a first frame having holes for guiding said control rods and said memory rods and having horizontal grooves for holding said inflatable tubes and said free moving pressure plate for the control rods and the memory rods.

8. The reconfigurable surface as described in claim 3, wherein the control rods, which are coincidentally addressed, are locked as the elevator rises and released as the elevator descends.

9. The reconfigurable surface as described in claim 1, wherein each memory rod of said memory rods is movable in a vertical direction against said flexible elastic sheet and is locked in place after being pushed to a predetermined position by the corresponding control.

10. The reconfigurable surface as described in claim 9, wherein the predetermined position is controlled by said computer.

11. The reconfigurable surface as described in claim 9, wherein each rod of said control rods is fitted with two pneumatically controlled locks, which release a particular control rod to move freely by coincident addressing.

12. The reconfigurable surface as described in claim 11, wherein said pneumatically controlled locks comprise a first lock for X-coordinate and a second lock for Y-coordinate.

13. The reconfigurable surface as described in claim 9, further comprising inflatable tubes to serve as brakes to lock the memory rods and the control rods in position when inflated.

14. The reconfigurable surface as described in claim 13, wherein said inflatable tubes are aligned in two dimensions for coincident addressing.

15. The reconfigurable surface as described in claim 14, where said inflatable tubes are aligned in two orthogonal directions.

16. The reconfigurable surface as described in claim 13, further comprising a freely moving pressure plate between each one of inflatable tubes and each one of said control rods.

17. The reconfigurable surface as described in claim 1, wherein each control rod of said control rods is movable in a vertical direction from a starting position against the corresponding memory rod of said memory rods and is locked in place when moved to said predetermined position.

18. The reconfigurable surface as described in claim 17, wherein said control rods are lowered away from each memory rod to reset to the starting position.

19. The reconfigurable surface as described in claim 1, wherein each one of said memory rods is fitted with two pneumatically controlled locks, which release a particular memory rod to move freely by coincident addressing.

20. A reconfigurable surface comprising:
a flexible elastic sheet;
a matrix of control rods placed under said flexible elastic sheet for contouring said flexible elastic sheet to a desired shape;
a means of controlling the position of each of said rods using data from a computer, wherein said flexible elastic sheet is supported and in contact with the tips of the said control rods, and the said flexible elastic sheet is sucked against the tips of the said control rods; and
a chamber for housing said control rods and control rod locking mechanism and evacuated for creating a suction to suck the flexible elastic sheet against the tips of the control rods.

21. The reconfigurable surface as described in claim 20, further comprising an elevator attached to the locking mechanism which can lock and unlock said control rods, and can raise and lower said control rods.

22. The reconfigurable surface as described in claim 21, wherein said elevator is reset at the lowest position when all the locks are released and the control rods drop to their lowest position.

23. The reconfigurable surface as described in claim 22, wherein the control rods, which are coincidentally addressed, are locked as the elevator rises and released as the elevator descends.

24. A reconfigurable surface, comprising:
a flexible elastic sheet; a matrix of control rods placed under said flexible elastic sheet for contouring said flexible sheet to a desired shape; and
means of controlling the position of each of said rods using data from a computer,
wherein each control rod of said control rods is movable in a vertical direction against said flexible elastic sheet and is locked in place when moved to a predetermined position; and
inflatable tubes and pressure plates to serve as brakes to lock the control rods in position when inflated.

25. The reconfigurable surface as described in claim 24, wherein said inflatable tubes are aligned in two orthogonal directions.

26. The reconfigurable surface as described in claim 24, further comprising a frame having holes for guiding the control rods and having horizontal grooves for holding said inflatable tubes and pressure plates for the control rods.

27. The reconfigurable surface as described in claim 24, further comprising a freely moving pressure plate between each one of the inflatable tubes and each one of the control rods.

* * * * *